United States Patent Office 3,118,925
Patented Jan. 21, 1964

3,118,925
METHOD OF PREPARING ISOCYANATES
Teruaki Mukaiyama, Ogikubo, Suginami-ku, Makoto Tokizawa, Amanuma, Suginami-ku, and Hiroyuki Nohira, Ota-ku, Tokyo, Japan, assignors to Toshio Hoshino, Teruaki Mukaiyama and Kaneyoshi Ashida, all of Tokyo, Japan
No Drawing. Filed Jan. 3, 1961, Ser. No. 80,009
Claims priority, application Japan Jan. 11, 1960
3 Claims. (Cl. 260—453)

This invention relates to a novel method of preparing organic isocyanates. More particularly the invention relates to a method of preparing isocyanates by the pyrolysis of specific acid amides as mentioned hereinafter.

Heretofore, there have been known a great number of methods of preparing organic isocyanates, the most generally practiced commercially feasible method being that wherein amine or its salt was reacted with phosgene. According to the phosgene method, it was however necessary to provide for manufacturing apparatuses of such as chlorine and carbon monoxide, and the cost thereof would occupy a very substantial portion of the cost of the isocyanate manufacturing equipment. In addition, the problem would arise as to how to utilize the ever increasingly produced by-products such as hydrochloric acid and caustic soda that would occur concomitantly with the increase in the production of the organic isocyanate. Therefore, if a commercially feasible method of preparing organic isocyanates without using phosgene could be found, it would be very valuable from the industrial standpoint.

As one of the methods of forming isocyanates without using phosgene, there is a method in which so-called "isocyanate generators" are heated at an elevated temperature. This is as shown in Formula 1

(1) R—NHCO·X → HX + R—NCO wherein R represents an organic group and HX, as set forth below, a compound having a replaceable hydrogen atom.

The isocyanate generator is that which is formed by the addition reaction of a compound having a replaceable hydrogen atom with an isocyanate, and is also referred to as an isocyanate adduct. As the compounds having a replaceable hydrogen, which are the starting material of these adducts, there are known such as secondary amines, tertiary alcohols, acid amides, lactams, phenols, mercaptans, enolizable hydrogen compounds, hydrogen cyanide and sodium bisulfite.

The reaction of Formula 1 is the reverse reaction of the addition reaction of these reactive hydrogen-containing compounds and an isocyanate, that is, it is a dissociation reaction. To be sure, this is an isocyanate forming reaction, but it is not a manufacturing method.

A primary object of this invention is to provide a novel method of preparing organic isocyanates by pyrolyzing compounds that differ completely from the conventional isocyanate generator.

Another object of the invention is to provide a method of preparing isocyanates which does not require the provisions for accessory equipment as in the case of the conventional methods, and moreover in which the troubles with respect to the disposition of the by-products are obviated.

A further object of the invention is to provide a method of obtaining isocyanates and nitriles at the same time.

By performing as described hereinafter, the various aforementioned objects can be achieved. Precisely, the method of preparing organic isocyanates in accordance with the present invention comprises passing through a reaction zone, such as a tube, an acid amide compound having the general formula $(R_1R_2R_3C-CONR_4)_n-Y$, wherein $R_1$ and $R_2$ are selected from the group consisting of hydrogen, chlorine and phenyl; $R_3$ is a member selected from the group consisting of chlorine, acetyl, nitrile, carbomethoxy, carbethoxy and phenyl; $R_4$ is a member selected from the group consisting of hydrogen, secondary alkyl and tertiary alkyl; Y is a member selected from the group consisting of lower alkyl, phenyl, monocyclo alkyl, phenylene, phenenyl, lower alkylene, and a phenenyl group having no hydrogen atom replaceable with an isocyanate; and $n$ stands for a valency of Y, said reaction zone being heated at 250–900° C., and thereafter separating the thus obtained organic isocyanate from the reaction product.

The novel reaction, which is the gist of the invention, taking the case when $R_4$ is H, includes a reaction represented by the following equation:

$$(R_1R_2R_3C-CONH)_n-Y \rightarrow Y-(NCO)_n + nR_1R_2R_3CH$$

In case $R_4$ is a secondary or a tertiary alkyl group, olefins are formed together with the above products.

Depending on the type of substituent group $R_1$, $R_2$ and $R_3$, and/or conditions of the reaction, nitrile $Y-(CN)_n$-forming reaction may take place concurrently with the above-described reaction. The nitrile can be readily separated from isocyanate by distillation. Considering the matter from the substituent angle, for example, there is the tendency that if the substituent used is that whose electronegativity is large such as an RCO group, etc., the yield of isocyanate increases, whereas if a substituent of small electronegativity such as a chlorine atom is used, the yield of nitriles increases.

Although compounds which are formed by the addition reaction of the enolizable compounds with isocyanate according to the prior methods have a similar formula as that of the acid amides of this invention, the acid amides to be used in the present invention can be clearly distinguished in the following points: Namely, (a) isocyanate generators are obtained by the addition reaction of organic isocyanates with replaceable hydrogen-containing compounds, whereas the starting material for preparing isocyanates of the present invention, that is, the acid amides, as represented by the general formula $$(R_1R_2R_3C-CONR_4)_n-Y$$

are not obtainable by the addition reatcion of isocyanate with enolizable compounds but have been synthesized by means of an entirely different reaction path; and (b) if the heretofore-held thinking as regards the isocyanate generators were to be applied to the acid amides of the present invention as represented by the formula $$(R_1R_2R_3C-CONR_4)_n-Y$$

and under such assumption a compound such as $$R_1R_2R_3CH$$

were to be separated from the above acid amides, the pKa value of the separated compound would be 14 or more whereas that of the conventional enolizable compounds to be used in forming the known insocyanate generator is 13 or less.

While the acid amides to be used in the present invention have already been defined by the general formula, as set forth hereinbefore, wherein generally the value of $n$ is a positive integer, when $n=1$, a monoisocyanate and/or a mononitrile are obtained and when $n=2$, a diisocyanate and/or a dinitrile are obtained. The invention is also applicable to compounds wherein $n$ is 3 or even larger, if necessary. It is, however, most suitable when $n$ is 1 or 2. In accordance with the invention, it is also possible to mix and use two or more of the aforesaid acid amides. In this case, a mixture of isocyanates and/or nitriles will be obtained.

In the aforementinoned general formula, Y may be substantially any group so long as it is an organic group having no hydrogen atom replaceable with an isocyanate.

As concrete examples of several of the acid amides represented by the aforementioned general formula, the following will be given, namely, acetoacetanilide acetoacet-o-toluidide, acetoacet-p-anisidide, acetoacet-p-chloroanilide, N-benzylacetoacetamide, N-cyclohexyl acetoacetamide, 2,4-di-acetoacetamino toluene [N,N'-(2,4-tolylene) - di-acetoacetamide], N,N'-hexamethylene-di-acetoacetamide, p-phenylene-di-acetoacetamide, N-tertiary butyl acetoacetanilide, α-dichloracetanilide, α-trichloro acetanilide, monochloroacetanilide, monocyanoacetanilide, and N-phenyl acetanilide[diphenylacetanilide].

The reaction temperature suitable for use in the present invention is that in which pyrolysis occurs but in which a substantial amount of decomposition products do not result, this being 250–900° C., that of 400–800° C. being particularly desirable. This pyrolysis is controlled chiefly by the temperature, it being possible to fully carry out the reaction with no fillers whatsoever in the reaction tube. There are however occasions when by using a suitable solid filler good results are obtained. As such a solid filler, any material which does not show change at the aforesaid temperatures and which does not adversely affect the reactants or the product, may be used. The size and shape of the particles of the filler will be determined by such as the reaction temperature, required flow rate, etc. As a few examples of fillers, which may be preferably used, there may be named such as quartz chips, pieces of glass, pieces of bricks, granite chips, andesite chips, pieces of ceramic ware, pieces of iron, pieces of stainless steel, pieces of nickel, and helipack packing made of Nichrome wire. As to such as the shape, length, inside diameter, etc. of the reaction tube, these may be selected optionally as the occasion demands.

While the atmosphere within the reaction tube may be air, it is more preferable to employ an atmosphere of an inert gas, for example, nitrogen, argon, carbon dioxide, Freon, acetone or other organic gases that do not react with isocyanate.

The pressure used is optional, it being permissible to carry out the reaction either under pressure, under atmospheric pressure or under reduced pressure.

In feeding the acid amides of the present invention to the reaction tube, they may be fed in any form such as a solution, an emulsion or a suspension in an inert medium as well as in the liquid, solid or gaseous state.

The temperature and pressure of the reaction may be suitably selected depending on the reaction conditions such as, for example, the space velocity, the linear velocity, the state of the feed of the starting material, the type, shape and size of the filler, the shape, length and inside diameter of the reaction tube etc.

While the product obtained will differ depending on the reaction conditions, at times, organic isocyanates being formed chiefly or at other times nitriles being formed chiefly, it is also possible to form concurrently both the isocyanates and nitriles. These products can be separated and purified in the usual manner by such as filtration and distillation. One of the merits of the invention is the fact that since the organic isocyanate obtained by the present invention in contrast to that obtained by the phosgene method does not contain as a by-product hydrochloric acid, the organic isocyanate obtained is of high purity which does not contain any acidic substance at all. In addition, as the by-products that are produced according to the present invention, for example, acetone, differ from the hydrochloric acid of the phosgene method in that there is completely no need for apprehension as regards corrosion, there are advantages in that not only is the selection of materials to be used for the manufacturing equipment simplified greatly but also there is no troublesomeness as in the case by the phosgene method in the storage, sale, etc. of the by products obtained. Further, there is also the advantage from a commercial standpoint in that no need exists for such as a salt electroylsis plant, phosgene manufacturing plant, etc. as already mentioned hereinbefore.

*Example 1*

50 parts of acetoacetanilide was pyrolyzed at 540° C. under reduced pressure 5.0 mm. Hg by using an apparatus consisting of a vertical quartz, 18 mm. in diameter and 120 cm. in length, equipped with standard taper joint and a side-inlet tube near the top for the exchange of air with nitrogen and for the stationary flow of the nitrogen gas. This tube was packed with quartz chips 95 cm. in length, and externally heated with electric furnace of 100 cm. in length. The temperature was determined by a pyrometer and the thermocouple attached to the outside of the pyrolysis tube. During pyrolysis, a slow stream of dry nitrogen gas was introduced through the capillary tube under reduced pressure. The pyrolysate was collected in a flask cooled in a Dry-Ice acetone bath and fractioned by distillation to yield 23 parts of phenyl isocyanate, B.P. 50° C./11 mm. and 5 parts of acetone, B.P. 55° C. From the residue, 4 parts of acetoacetanilide was recovered along with 1 part of sym-diphenylurea.

*Example 2*

Using the apparatus as in Example 1, there was fed a solution of 100 parts of acetoacetanilide in 200–240 parts of acetone to the reaction zone to pyrolyze acetoacetanilide at 550° C. under atmospheric pressure. 25 parts of phenyl isocyanate and 10 parts of sym-diphenylurea were obtained. And 24 parts of acetoacetanilide was recovered.

*Example 3*

Using the apparatus as in Example 2, there was fed 100 parts of acetoacetanilide to the reaction zone which was kept at 570° C. under atmospheric pressure. 29 parts of phenyl isocyanate and 10 parts of sym-diphenylurea were obtained.

*Example 4*

Using the apparatus as in Example 1, 50 parts of acetoacetanilide was pyrolyzed at 550° C. under reduced pressure 20 mm. Hg. 13 parts of phenyl isocyanate, 2 parts of acetone and 11 parts of sym-diphenylurea were obtained.

*Example 5*

Using the apparatus as in Example 1, 50 parts of acetoacetanilide was pyrolyzed at 740° C. under reduced pressure 5.0 mm. Hg. 15 parts of phenyl isocyanate, 3 parts of acetone and 8 parts of sym-diphenylurea were obtained.

*Example 6*

Using the apparatus as in Example 1, 50 parts of acetoacetanilide was pyrolyzed at 620° C. under reduced pressure 5 mm. Hg. 9 parts of phenyl isocyanate, 2 parts of acetone and 6 parts of sym-diphenylurea were obtained.

*Example 7*

Using the apparatus as in Example 1, 50 parts of acetoacetanilide was pyrolyzed at 520° C. under reduced pressure 5 mm Hg. 17 parts of phenyl isocyanate, 5 parts of acetone and 3 parts of sym-diphenylurea were obtained. 15 parts of acetoacetanilide was recovered.

*Example 8*

Using the apparatus as in Example 1, 50 parts of acetoacetanilide was pyrolyzed at 460° C. under reduced pressure 6 mm. Hg. 15 parts of phenyl isocyanate, 4 parts of acetone and 5 parts of sym-diphenylurea were obtained. 3 parts of acetoacetanilide was recovered.

Example 9

Using the apparatus as in Example 1, 50 parts of acetoacetanilide was pyrolyzed at 460° C. under reduced pressure 4.5 mm. Hg. 16 parts of phenyl isocyanate and 6 parts of sym-diphenylurea were obtained. 7 parts of acetoacetanilide was recovered.

Example 10

Using the apparatus as in Example 1, 50 parts of acetoacetanilide was pyrolyzed at 430–450° C. under reduced pressure 1.0–3.0 mm. Hg. 16 parts of phenyl isocyanate, 4 parts of acetone and 2 parts of sym-diphenylurea were obtained. And 15 parts of acetoacetanilide was recovered.

Example 11

Using the apparatus as in Example 1, 50 parts of acetoacetanilide was pyrolyzed at 380–40° C. under reduced pressure 1.0–3.0 mm. Hg. 3 parts of phenyl isocyanate was obtained and 35 parts of acetoacetanilide was recovered.

Example 12

Using the apparatus as in Example 1, 50 parts of acetoacet-p-toluidide was pyrolyzed at 545° C. under reduced pressure 5 mm. Hg. 24 parts of p-tolyl isocyanate and 3 parts of sym-di-tolylurea were obtained. 5 parts of acetoacet-p-toluidide was recovered.

Example 13

Using the apparatus as in Example 1, 50 parts of acetoacet-o-toluidide was pyrolyzed at 530–540° C. under reduced pressure 5.0 mm. Hg. 18 parts of o-tolyl isocyanate B.P. 85° C./27 mm. and 4 parts of sym-di-o-tolylurea were obtained. 7 parts of acetoacet-o-toluidide was recovered.

Example 14

Using the apparatus as in Example 1, 50 parts of acetoacet-p-anisidide was pyrolyzed at 450° C. under reduced pressure 5 mm. Hg. 14 parts of p-anisyl isocyanate B.P. 72–73° C./2 mm. and 1 part of sym-di-p-anisurea were obtained. 16 parts of acetoacet-p-anisidide was recovered.

Example 15

Using the apparatus as in Example 1, 50 parts of acetoacet-p-chloroanilide was hydrolyzed at 540–550° C. under reduced pressure 4.5–5.0 mm. Hg. 21 parts of p-chlorophenyl isocyanate B.P. 90°/20 mm., 4 parts of acetone and 4 parts of sym-di-p-chlorophenylurea were obtained. And 7 parts of acetoacet-p-chloroanilide was recovered.

Example 16

Using the apparatus as in Example 1, 50 parts of N-n-hexylacetoacetamide was pyrolyzed at 550° C. under reduced pressure 6.5–7.0 mm. Hg. 14 parts of n-hexyl-isocyanate B.P. 67–68° C./24 mm. and 3 parts of acetone were obtained.

Example 17

Using the apparatus as in Example 1, 50 parts of N-benzylacetoacetamide was pyrolyzed at 550° C. under reduced pressure 4.5 mm. Hg. 8 parts of benzyl isocyanate B.P. 51° C./13 mm. and 2 parts of acetone were obtained. And 8 parts of N-benzyl acetoacetamide was recovered.

Example 18

Using the apparatus as in Example 1, 50 parts of N-cyclohexyl acetoacetamide was pyrolyzed at 550° C. under reduced pressure 5 mm. Hg. 9 parts of cyclohexyl isocyanate, 4 parts of acetone and 4 parts of cyclohexene were obtained.

Example 19

Using the apparatus as in Example 1, 17 parts of N-t-butyl-acetoacetanilide was pyrolyzed in the range of 570° C. to 580° C. over a period of 18 minutes under reduced pressure 2.5 mm. Hg. 5 parts of phenyl isocyanate and 1 part of acetone were obtained. The yield of phenyl isocyanate was 60% of theory.

Example 20

50 parts of 2,4-di-acetoacetamino toluene [N,N'-(2,4-tolylene)-di-acetoacetamide] was pyrolyzed at 600° C. over a period of 140 minutes under reduced pressure ranging from 1 mm. to 7 mm. Hg by using an apparatus consisted on a vertical quartz, 27 mm. in diameter and 90 cm. in length, equipped with standard taper joint and a side-inlet tube near the top of the reaction tube, packed with Raschig rings 5 x 5 mm. 6 parts of 2,4-tolylene diisocyanate was obtained. The yield was 19.1% of theory.

Example 21

30 parts of 2,4-di-acetoacetamino toluene [N,N'-(2,4-tolylene)-di-acetoacetamide] was pyrolyzed at 700° C. over a period of 35 minutes under reduced pressure ranging from 3 mm. to 25 mm. Hg by using an apparatus as in Example 20. 4 parts of 2,4-tolylene diisocyanate was obtained. The yield was 22.8% of theory.

Example 22

Using the apparatus as in Example 20, packed with Raschig rings 50 cm. in length, 100 parts of 2,4-di-acetoacetamino toluene [N,N'-(2,4-tolylene-di-acetoacetamide] was pyrolyzed at 550° C. over a period of 45 minutes under reduced pressure 1.5 mm. Hg. 8.4 parts of 2,4-tolylene diisocyanate was obtained along with 21 parts of tarry product deposited on upper side and 28 parts on under side of the reaction zone. The yield of 2,4-tolylene diisocyanate was 27.7% of theory.

Example 23

Using the apparatus as in Example 22, 100 parts of 2,4-di-acetoacetamino toluene [N,N'-(2,4-tolylene)-di-acetoacetamide] was pyrolyzed at 600° C. over 45 minutes under reduced pressure 1.0 mm. Hg. 12 parts of 2,4-tolylene diisocyanate was obtained along with 8 parts of tarry product deposited on upper side and 28 parts on under side of the reaction zone. The yield of 2,4-tolylene diisocyanate was 37.6% of theory.

Example 24

Using the apparatus as in Example 22, 100 parts of 2,4-diacetoacetamino toluene [N,N'-(2,4-tolylene)-di-acetoacetamide] was pyrolyzed at 650° C. over 45 minutes under reduced pressure 1.5 mm. Hg. 12.2 parts of 2,4-tolylene diisocyanate was obtained along with 18 parts of tarry product deposited on upper side and 13 parts on under side of the reaction zone. The yield of 2,4-tolylene diisocyanate was 39.3% of theory.

Example 25

Using the apparatus as in Example 22, 28 parts of 1,6-diacetoacetylamino hexane [N,N'-hexamethylene-di-acetoacetamide] was pyrolyzed at 600° C. under reduced pressure 1 mm. Hg. 3 parts of 1,6-hexamethylene diisocyanate was obtained.

Example 26

Using the apparatus as in Example 22, 22 parts of 1,2-diacetoacetylamino ethane [N,N' - ethylene-di-acetoacetamide] was pyrolyzed at 650° C. under reduced pressure 5 mm. Hg. 2 parts of 1,2-ethylene diisocyanate was obtained.

Example 27

Using the apparatus as in Example 1, 50 parts of α-dichloroacetanilide was pyrolyzed at 560° C. over a period of 40 minutes under reduced pressure in the range of 5 mm. to 15 mm. Hg. 10 parts of benzonitrile and 2 parts of phenyl isocyanate were obtained.

Example 28

Using the apparatus as in Example 1, 40 parts of N-benzyl α-trichloroacetamide was pyrolyzed in the range of 550° C. to 560° C. over a period of 43 minutes under reduced pressure in the range of 4.5 mm. to 5.0 mm. Hg. 10 parts of phenylacetonitrile B.P. 75°/1.5 mm. was obtained. The yield of phenylacetonitrile was 54% of theory.

Example 29

Using the apparatus as in Example 1, 40 parts of α-dichloro-p-methoxy anilide was pyrolyzed at 500° C. under reduced pressure 6–10 mm. Hg. 4 parts of anisonitrile and 1 part of anisyl isocyanate were obtained.

Example 30

Using the apparatus as in Example 1, 50 parts of α-dichloroaceto-p-nitro anilide was pyrolyzed at 530–550° C. under reduced pressure 5–10 mm. Hg. 8 parts of p-nitrophenyl isocyanate were obtained.

Example 31

Using the apparatus as in Example 1, 50 parts of α-trichloro acetanilide was pyrolyzed at 520–530° C. under reduced pressure 6–10 mm. Hg. 13 parts of benzonitrile and 2 parts of phenyl isocyanate were obtained.

Having thus set forth the nature of the invention, what we claim herein is:

1. A method of preparing organic isocyanates which comprises passing through a reaction zone an acid amide compound having the general formula $$(R_1R_2R_3C\text{---}CONR_4)_n\text{---}Y$$

wherein $R_1$ and $R_2$ are selected from the group consisting of hydrogen, chlorine and phenyl, $R_3$ is a member selected from the group consisting of chlorine, acetyl, nitrile, carbomethoxy, carbethoxy, and phenyl, $R_4$ is a member selected from the group consisting of hydrogen, secondary alkyl and tertiary alkyl, Y is a member selected from the group consisting of lower alkyl, phenyl, monocyclo alkyl, lower alkylene, phenylene, phenenyl and a phenenyl group having no hydrogen atom replaceable with an isocyanate, and $n$ stands for a valency of Y, said reaction zone being heated at 250–900° C., and thereafter separating the thus obtained organic isocyanate from the reaction product.

2. A method as defined in claim 1, wherein said pyrolysis is carried out in a reaction system containing a solid filler heated at 250–900° C.

3. A method as defined in claim 1, wherein said acid amide compound is an acetoamide selected from the group consisting of acetoacetamide, mono-chloroacetamide, dichloroacetamide and trichloroacetamide.

References Cited in the file of this patent

UNITED STATES PATENTS

| | | |
|---|---|---|
| 2,580,468 | Schaefer et al. | Jan. 1, 1952 |
| 2,683,729 | Seeger et al. | July 13, 1954 |